US012679996B2

(12) United States Patent
   Faris

(10) Patent No.: US 12,679,996 B2
(45) Date of Patent: Jul. 14, 2026

(54) DUAL CURE THERMOFORMABLE COATING AND COATED ARTICLES

(71) Applicant: Vampire Optical Coatings, Inc., Pataskala, OH (US)

(72) Inventor: Tom Faris, Mount Perry, OH (US)

(73) Assignee: VAMPIRE OPTICAL COATINGS, INC., Pataskala, OH (US)

( * ) Notice: Subject to any disclaimer, the term of this patent is extended or adjusted under 35 U.S.C. 154(b) by 881 days.

(21) Appl. No.: 17/878,656

(22) Filed: Aug. 1, 2022

(65) Prior Publication Data

US 2023/0038427 A1    Feb. 9, 2023

Related U.S. Application Data

(60) Provisional application No. 63/227,586, filed on Jul. 30, 2021.

(51) Int. Cl.

| | | |
|---|---|---|
| *C09D 175/04* | (2006.01) | |
| *B32B 27/40* | (2006.01) | |
| *C09D 7/20* | (2018.01) | |
| *C09D 7/48* | (2018.01) | |
| *C09D 7/61* | (2018.01) | |
| *C09D 133/08* | (2006.01) | |
| *C09D 133/10* | (2006.01) | |

(52) U.S. Cl.
   CPC ............. *C09D 175/04* (2013.01); *C09D 7/20* (2018.01); *C09D 7/48* (2018.01); *C09D 7/61* (2018.01); *C09D 133/08* (2013.01); *C09D 133/10* (2013.01)

(58) Field of Classification Search
   CPC ........ C08L 75/04; C09D 175/04; B32B 27/04
   USPC ................................... 528/45, 85; 428/423.1
   See application file for complete search history.

(56) References Cited

U.S. PATENT DOCUMENTS

| | | | |
|---|---|---|---|
| 3,558,564 A | 1/1971 | Vasta | |
| 4,555,535 A | 11/1985 | Bednarek et al. | |

| | | | | |
|---|---|---|---|---|
| 4,727,100 A | 2/1988 | Vasta | | |
| 6,617,413 B1 | 9/2003 | Bruchmann et al. | | |
| 6,747,088 B1 | 6/2004 | Schwalm et al. | | |
| 7,144,955 B2 | 12/2006 | Grace et al. | | |
| 7,265,179 B2 | 9/2007 | Jin et al. | | |
| 7,857,905 B2 | 12/2010 | Hayes | | |
| 8,147,923 B2 | 4/2012 | Baumgart et al. | | |
| 2006/0052573 A1* | 3/2006 | Facke | ............... | C08G 18/8175 |
| | | | | 528/44 |
| 2006/0116502 A1* | 6/2006 | Gurtler | ............... | C08G 18/807 |
| | | | | 528/44 |
| 2009/0069459 A1* | 3/2009 | James | ...................... | C08J 3/243 |
| | | | | 522/108 |
| 2009/0269568 A1 | 10/2009 | Kuhlmann et al. | | |
| 2010/0104769 A1* | 4/2010 | Boisseau | ............... | B05D 3/148 |
| | | | | 250/492.3 |

FOREIGN PATENT DOCUMENTS

| | | |
|---|---|---|
| WO | 2003087246 A1 | 10/2003 |

OTHER PUBLICATIONS

Product data sheet for Desmophen® VP LS 2089, provided by Covestro. (Year: 2017).*

"Titration Application M453-2009", provided by Mettler Toledo (no date).*

Jung, Kevin Injoe, et al. "Characteristics of dual-curable blocked isocyanate with thermal radical initiator for low-temperature curing of automotive coatings." Progress in Organic Coatings 125 (2018): 160-166. https://doi.org/10.1016/j.porgcoat.2018.09.009.

June, Young-Gun, et al. "Effect of urethane crosslinking by blocked isocyanates with pyrazole-based blocking agents on rheological and mechanical performance of clearcoats." Coatings 10.10 (2020): 961. https://doi.org/10.3390/ coatings 10100961.

Frisch, K. C. (2002). Chemistry and technology of polyurethane adhesives. Adhesion Science and Engineering, 759-812. doi:10. 1016/b978-044451140-9/50016-0.

* cited by examiner

*Primary Examiner* — Michael J Feely

(74) *Attorney, Agent, or Firm* — Tarolli, Sundheim, Covell & Tummino LLP

(57)    ABSTRACT

A coating has dual curing mechanisms wherein the first cure reaction and second cure reaction become active due to differing reaction mechanisms.

22 Claims, No Drawings

DUAL CURE THERMOFORMABLE COATING AND COATED ARTICLES

RELATED APPLICATION

This application claims priority from U.S. Provisional Application No. 63/227,586, filed Jul. 30, 2021, the subject matter of which is incorporated herein by reference in its entirety.

BACKGROUND

Clear plastic materials like PMMA, bisphenol A polycarbonate, and PET find many uses in everyday life as flat sheet and formed parts: as windows, safety visors, motorcycle windshields, UTV windshields, inspection boxes and a multitude of other uses. One of the downsides of clear plastics being used as substitutes for glass is the relative ease with which these plastics are scratched or damaged in everyday use with the resultant loss of the desired optical properties.

While there are multiple methods to improve the abrasion and chemical resistance of clear coated plastics; such as, polymethyl methacrylate, polycarbonate, PET and PETG films, these methods typically suffer if there is a requirement to form the parts into complex curves or 3-Dimensional shapes. Coated plastic parts prepared using thermoforming or other thermomechanical can crack or fail due to the hardness and concomitant brittleness of the crosslinked coatings.

One solution to this issue has been to form the plastic parts and then coat the plastic parts. This method suffers from the extra handling and economic burden placed on operations: the parts must be kept clean; the usage of the coating and drying equipment is not easily optimized due to changing shapes and part geometries.

One solution offered by Momentive Performance Materials, described in U.S. Pat. No. 7,857,905B2 is a polysiloxane thermally cured coating that exhibits a flexible coating structure (i.e., high elongation) prior to thermoforming operations. While effective, this coating system suffers from high cost due to the necessity of primer systems to facilitate adhesion and other issues.

US Patent Application 2009/0269568A1 describes a polyurethane prepolymer with acrylate/methacrylate containing coating system with groups that are reactive upon exposure to actinic radiation. This application does not mention the use of active solvents or blocked isocyanates in their dual cure coating system.

U.S. Pat. No. 7,265,179 B2 describes dual cure formable siloxane coating with pendant epoxy groups that allows for the formation of a coating that can be applied to articles, cured using thermal energy and which develops its full properties during the secondary thermal treatment process.

U.S. Pat. No. 8,147,923 describes a dual cure UV and thermal system that is used for automotive clearcoat applications. The coating described uses isocyanates, blocked and unblocked, in their compositions. This patent does not mention forming of parts nor does the patent contemplate the use of alcohol solvents in the compositions.

EP 1,529,793A2 describes dual cure UV/thermal system that employs blocked isocyanates and actinic radiation curable coating; however, this patent does not mention formable clear coated plastic articles or casting these coatings from alcohol solvents.

U.S. Pat. No. 5,234,970 describes a dual cure polyurethane photoreactive system; however, this system is used as a conformal coating system, does not employ blocked isocyanates nor consider coating and forming plastic parts into complex geometries.

SUMMARY

Embodiments described herein relate to a dual-curable, coating composition that can be packaged as a single coating system and is castable from alcohols or other active solvents. The coating composition includes an alcohol soluble blocked polyisocyanate, polyol with a hydroxyl functionality greater than 2, and acrylate and/or methacrylate bearing monomer or oligomer with pendant and/or terminal isocyanate reactive groups. The blocked poly isocyanate can prevent premature reaction of the polyisocyanates with isocyanate reactive groups of the methacrylate bearing monomer or oligomer. The composition is curable to a tack-free, deformable coating by actinic radiation, and the tack-free, deformable coating is further curable to a rigid, abrasion and/or chemical resistant coating by thermal energy. The coating composition provides flexibility and a delayed onset of the secondary reaction thereby allowing thermoforming operations to be performed on coated articles; thus, facilitating the manufacture of complex 3D articles or parts from flat sheet or film stock.

In some embodiments, the tack-free, deformable coating has a glass transition temperature (Tg) of about 38° C. to about 115° C., about 60° C. to about 100° C., or about 80° C. to about 100° C. and a tanδ of about 1.7 to about 3.30, 1.8 to about 3.0, or about 1.9 to about 2.6, and the rigid, abrasion resistant coating has a Tg of about 80° C. to about 130° C., about 90° C. to about 125° C., or about 115° C. to about 125° C. and a tanδ of about 0.50 to about 2.50, about 0.7 to about 2.45, or about 1.48 to about 2.45.

In other embodiments, the composition can further include a photoinitiator and optionally at least one of polyurethane catalyst, an alcohol solvent, a UV light inhibitor, a hindered amine light stabilizers, a flow control agent, an amine synergist, or inorganic oxide particles.

In some embodiments, the composition can include an alcohol solvent, and the composition can be castable from the alcohol solvent on a substrate to form the tack-free, deformable coating on the substrate. Preferably, the alcohol solvent is not reactive with the substrate.

In other embodiments, two of the blocked polyisocyanate, the polyol with a hydroxy functionality greater than 2, or the acrylate and/or methacrylate bearing monomer or oligomer with pendant and/or terminal isocyanate reactive groups are the same compound.

In some embodiments, the composition is applied to a thermoformable substrate and the thermal energy is applied to the tack-free deformable coating on the thermoformable substrate during thermoforming the tack-free deformable coating and substrate.

In some embodiments, the blocked polyisocyanate can include at least one of a blocked hexamethylene diisocyanate, blocked hexamethylene diisocyanate biuret, blocked hexamethylene diisocyanate trimer, blocked isophorone diisocyanate, or a blocked functional urethane acrylate resin. The blocked polyisocyanate can be blocked with a blocking group selected from diethyl malonate, 3,5 dimethyl pyrazole, methyl ethyl ketoxime, or caprolactam.

In some embodiments, the polyol has a hydroxyl equivalent weight of about 200 to about 6000 grams/mole.

In other embodiments, the polyol can be derived from at least one of pentaerythritol, glycerol, or caprolactone.

In some embodiments, the acrylate and/or methacrylate bearing monomer or oligomer can include pendant and/or terminal hydroxyl groups. The acrylate and/or methacrylate bearing monomer or oligomer can have a hydroxyl equivalent weight of about 200 to about 6000 grams/mole and an acrylate and/or methacrylate functionality of about 2 to about 8.

In some embodiments, the rigid, abrasion resistant coating can be substantially crack-free and have a total light transmittance of at least about 86% as measured at a wavelength of 400 to 700 nm in accordance with ASTM D1003, a delta haze in accordance with ASTM D1003 of about 8.0% or less, a yellow index in accordance with ASTM E313 of 3 or less, and an adhesion of at least 3B or greater in accordance with ASTMD3359.

Other embodiments described herein relate to a coated substrate that includes a coating and a substrate. The coating includes an alcohol soluble blocked polyisocyanate, polyol with a hydroxy functionality greater than 2, and acrylate and/or methacrylate bearing monomer or oligomer with pendant and/or terminal isocyanate reactive groups. The coating is curable to a tack-free, deformable state by actinic radiation and is further curable to rigid, abrasion resistant state by thermal energy.

In some embodiments, the tack-free deformable coating exhibits a glass transition temperature (Tg) of about 38° C. to about 115° C., about 60° C. to about 100° C., or about 80° C. to about 100° C. and a $\tan\delta$ of about 1.7 to about 3.30, 1.8 to about 3.0, or about 1.9 to about 2.6, and the rigid, abrasion resistant coating has a Tg of about 80° C. to about 130° C., about 90° C. to about 125° C., or about 115° C. to about 125° C. and a $\tan\delta$ of about 0.50 to about 2.50, about 0.7 to about 2.45, or about 1.48 to about 2.45.

In some embodiments, a blocking group of the blocked isocyanate forms a UV stabilizer that is latent during a UV radiation cure process but after an unblocking reaction by thermal energy curing is effective in absorbing damaging UV radiation and thereby protecting the substrate from UV radiation.

In some embodiments, the coated substrate is in the form of a flat sheet or film that is tack-free after actinic radiation curing and has a three dimension geometry different that the flat sheet or film following thermoforming. The coating following thermoforming can be substantially crack-free and have a total light transmittance of at least about 86% as measured at a wavelength of 400 to 700 nm in accordance with ASTM D1003, a delta haze in accordance with ASTM D1003 of about 8.0% or less, a yellow index in accordance with ASTM E313 of 3 or less, and an adhesion of at least 3B in accordance with ASTMD3359.

In some embodiments, the substrate can include an optically transparent polymer. For example, the optically transparent polymer can include at least one of polymethyl methacrylate, polycarbonate, or PET.

In other embodiments, the coated substrate can include at least one of a protective visor, a windshield for a motor vehicle, a lens, a decorative automotive trim, window, roof, door system, or molding.

DETAILED DESCRIPTION

For convenience, certain terms employed in the specification, examples, and appended claims are collected here. Unless defined otherwise, all technical and scientific terms used herein have the same meaning as commonly understood by one of ordinary skill in the art to which this application belongs.

The articles "a" and "an" are used herein to refer to one or to more than one (i.e., to at least one) of the grammatical object of the article. By way of example, "an element" means one element or more than one element.

The terms "comprise," "comprising," "include," "including," "have," and "having" are used in the inclusive, open sense, meaning that additional elements may be included. The terms "such as", "e.g.,", as used herein are non-limiting and are for illustrative purposes only. "Including" and "including but not limited to" are used interchangeably.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

Throughout the description, where compositions are described as having, including, or comprising, specific components, it is contemplated that compositions also consist essentially of, or consist of, the recited components. Similarly, where methods or processes are described as having, including, or comprising specific process steps, the processes also consist essentially of, or consist of, the recited processing steps. Further, it should be understood that the order of steps or order for performing certain actions is immaterial so long as the compositions and methods described herein remains operable. Moreover, two or more steps or actions can be conducted simultaneously.

The term "or" as used herein should be understood to mean "and/or", unless the context clearly indicates otherwise.

As used herein, the term "about" or "approximately" refers to a quantity, level, value, number, frequency, percentage, dimension, size, amount, weight or length that varies by as much as 15%, 10%, 9%, 8%, 7%, 6%, 5%, 4%, 3%, 2% or 1% to a reference quantity, level, value, number, frequency, percentage, dimension, size, amount, weight or length. In one embodiment, the term "about" or "approximately" refers a range of quantity, level, value, number, frequency, percentage, dimension, size, amount, weight or length±15%, ±10%, ±9%, ±8%, ±7%, ±6%, ±5%, ±4%, ±3%, ±2%, or ±1% about a reference quantity, level, value, number, frequency, percentage, dimension, size, amount, weight or length.

Throughout this disclosure, various aspects of this invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual and partial numbers within that range, for example, 1, 2, 3, 4, 5, 5.5 and 6. This applies regardless of the breadth of the range.

Embodiments described herein relate to a dual-curable, coating composition that can be packaged as a single coating system and be castable from low toxicity alcohols or other active solvents by dip coating, flow coating, roll coating or spray coating to yield a coated article, film, sheet, or substrate. The composition is curable to a tack-free, deformable coating by actinic radiation, and the tack-free, deformable coating is further curable to a rigid, abrasion and/or chemical resistant coating by thermal energy. The coating composition allows the formation of flat sheets or films into coated articles that have complex three dimensional (3D) geometries without cracking or adhesive failure of the coated articles.

The coating composition includes a blocked polyisocyanate, a polyol with a hydroxyl functionality greater than 2, and an acrylate and/or methacrylate bearing monomer or oligomer with pendant and/or terminal isocyanate reactive groups, each of which can be soluble in an alcohol for use in casting the composition. The coating composition can react via isocyanate reactive groups of the acrylate and/or methacrylate bearing monomer or oligomers in 2 stages: formation of a tack-free, deformable or flexible, film or coating via acrylate and/or methacrylate polymerization or curing by actinic radiation followed by unblocking of the isocyanates at elevated temperatures using thermal energy to provide free isocyanate groups that can react with isocyanate reactive groups via a urethane type reaction to provide a rigid, abrasion resistant coating. Advantageously, initially curing the coating by actinic radiation allows the coated article to be handled prior to thermoforming. Blocking of the isocyanates prevents reaction with desired alcohol solvents used for casting the composition and delays onset of secondary cross linking reactions until unblocking of the isocyanates during thermoforming.

In some embodiments, the polyisocyanate that is blocked can include any polyisocyanate that is soluble in a low toxicity solvent, such as alcohol or glycol ether. The polyisocyanate, which also include diisocyanates, can be aromatic, araliphatic, aliphatic or cycloaliphatic polyisocyanates. Mixtures of these di- or polyisocyanates can also be used. Examples of polyisocyanates are butylene diisocyanate, hexamethylene diisocyanate (HDI), isophorone diisocyanate (TPDI), 2,2,4- and/or 2,4,4-trimethylhexamethylene diisocyanate, the isomeric bis(4,4'-isocyanatocyclohexyl) methanes or mixtures thereof with any isomer content, isocyanatomethyl-1,8-octane diisocyanate, 1,4-cyclohexylene diisocyanate, 1,4-phenylene diisocyanate, 2,4- and/or 2,6-toluene diisocyanate, the isomeric xylene diisocyanates, 1,5-naphthylene diisocyanate, 2,4'- or 4,4'-diphenylmethane diisocyanate, triphenylmethane-4,4',4"-triisocyanate or the derivatives thereof with a urethane, isocyanurate, allophanate, biuret, oxadiazine trione, uretdione or iminooxadiazine dione structure and mixtures thereof.

In some embodiments, the blocked polyisocyanate can include blocked hexamethylene diisocyanate, hexamethylene diisocyanate biuret, blocked hexamethylene diisocyanate trimer, blocked isophorone diisocyanate, or a blocked functional urethane acrylate resin.

The blocked polyisocyanate can be blocked with a blocking group selected from acetone oxime, diethyl ketoxime, methyl isopropyl ketoxime, methyl isobutyl ketoxime, diisopropyl ketoxime, methyl ethyl ketoxime, dimethyl pyrazole, malonic acid dimethyl ester, acetoacetic acid ethyl ester, caprolactam, pyrazole, and alkyl pyrazoles. In some embodiments, the blocking group can be selected from diethyl malonate, 3,5 dimethyl pyrazole, methyl ethyl ketoxime, or caprolactam. Advantageously, the blocking group of the blocked isocyanate forms a UV stabilizer that is latent during a UV radiation cure process but after an unblocking reaction by thermal energy curing is effective in absorbing damaging UV radiation and thereby protecting the coating and underlying substrate from UV radiation. An example of such a blocking group is 3,5 dimethyl pyrazole.

In preparing the blocked polyisocyanate, typically, the polyisocyanates are combined with a solvent and the blocking agent is added until the NCO peak (as observed through IR spectrophotometry) disappears.

In some embodiments, the polyol with a hydroxyl functionality greater than two can have a hydroxyl equivalent weight of about 200 to about 6000 grams/mole (e.g., about 200 to about 4000 grams/moles). The polyol can be derived from at least one of pentaerythritol, glycerol, or caprolactone. For example, the polyol can be a caprolactone polyol, such as CAPA 4101 or a similar compound.

In other embodiments, the acrylate and/or methacrylate bearing monomer or oligomer with pendant and/or terminal isocyanate reactive groups can include pendant and/or terminal hydroxyl groups, amine groups, or other groups that are reactive in polyurethane chemistry.

In some embodiments, the acrylate and/or methacrylate bearing monomer or oligomer with pendant and/or terminal isocyanate reactive groups can include actinic radiation curable acrylate and/or methacrylate bearing monomers or oligomers with pendant or terminal hydroxyl groups. The pendant or terminal hydroxyl groups can allow for the creation of an interpenetrating polymer network, such as crosslinked polyurethane coating network with isocyanate group of the polyisocyanate compound. The acrylate and/or methacrylate bearing monomer or oligomer can have a hydroxyl equivalent weight of about 200 to about 6000 grams/mole (e.g., about 200 to about 4000 grams/moles) and an acrylate and/or methacrylate functionality of about 2 to about 8. Examples of acrylate and/or methacrylate bearing monomer or oligomer with pendant and/or terminal hydroxyl groups can include di-(meth)acrylates of glycols containing from 2 to 6 carbon atoms and poly(meth)acrylates of polyols containing from 3 to 4 hydroxyl groups and 3 to 6 carbon atoms. Specific useful di-(meth)acrylates and poly(meth)acrylates include ethyleneglycol diacrylate, 1,3-propanediol diacrylate, 1,4-butanediol diacrylate, 1,6-hexanediol diacrylate, trimethylolpropane triacrylate, pentaerythritol tetraacrylate, and the corresponding di- and polymethacrylates. Also useful are the di-(meth)acrylates of ether-group containing diols and the poly(meth)acrylates of ether-group containing polyols.

In some embodiments, two of the blocked polyisocyanate, the polyol with a hydroxy functionality greater than 2, or the acrylate and/or methacrylate bearing monomer or oligomer with pendant and/or terminal isocyanate reactive groups are the same compound. For example, the polyol and the acrylate and/or methacrylate bearing monomer or oligomer with pendant and/or terminal isocyanate reactive groups can be the same compound. In other embodiments, the blocked polyisocyanate, the polyol with a hydroxy functionality greater than 2, or the acrylate and/or methacrylate bearing monomer or oligomer with pendant and/or terminal isocyanate reactive groups are separate compounds.

In some embodiments, the composition can further include a photoinitiator to promote polymerization and/or crosslinking of the acrylate and/or methacrylate bearing monomer or oligomer. Photoinitiators are commercially marketed compounds which are known per se, with a differentiation being made between unimolecular (type I) and bimolecular (type II) initiators. (Type I) systems are, e.g., aromatic ketone compounds, e.g., benzophenones in combination with tertiary amines, alkyl benzophenones, 4,4'-bis(dimethylamino)benzophenone (Michler's ketone), anthrone and halogenated benzophenones or mixtures of the above types. Also suitable are (type II) initiators, such as benzoin and its derivatives, benzyl ketals, acyl phosphine oxides, e.g., 2,4,6-trimethylbenzoyl diphenylphosphine oxide, bisacyl phosphine oxides, phenylglyoxylic acid ester, camphorquinone, α-aminoalkylphenones, α-dialkoxy-ac-etophenones and α-hydroxyalkylphenones. It may also be advantageous to use mixtures of these compounds. Suitable initiators are commercially available, e.g., with the designations Irgacure and Darocur (Ciba, Basel, CH) and Esacure (Fratelli Lamberti, Adelate, IT).

In some embodiments, the composition can include an alcohol solvent, and the composition can be castable from the alcohol solvent on a substrate to form the tack-free, deformable coating on a substrate. Preferably, the alcohol solvent is not reactive with a substrate. The alcohol solvent can include, for example, methanol, ethanol, propanol, butanol, common glycol ethers, or propoxylated glycol ethers. In some embodiments, the solvent is not water and the composition is non-aqueous.

The composition can optionally include at least one of a polyurethane catalyst, a UV light inhibitor, a hindered amine light stabilizers, an amine synergist, fillers, antioxidants, anti-settling agents, defoamers, wetting agents, flow promoters, plasticizers, antistatic agents, catalysts, co-solvents, thickeners, pigments, dyes and/or flatting agents.

The polyurethane catalyst can include any agent that can accelerate the urethane isocyanate exothermic condensation reaction or facilitate the reaction of the polyols and hydroxyl bearing compounds with the isocyanates in the coating system. Examples of polyurethane catalysts include triethylamine, 1,4-diazabicyclo-[2,2,2]-octane, tin dioctoate, bismuth octoate or dibutyltin dilaurate. Dibutyltin dilaurate (DBTL) is preferred. In addition to catalysts, the addition of stabilizers which protect the (meth)acrylate groups from spontaneous, undesirable polymerization may also be useful. The compounds having (meth)acrylate groups that are used generally already contain such stabilizers.

In some embodiments, the filler can include inorganic and/or metal oxide particles, glass fibers, carbon blacks, carbon nanotubes and/or metallic fillers. The inorganic oxides and/or metal oxides can include, for example, silicon oxides, aluminum oxides, titanium oxides, zinc oxides, germanium oxides, indium oxides, tin oxides, zirconium oxides, antimony oxides and/or combinations thereof.

In some embodiments, the coating composition can be mixed and applied from alcoholic solvents, such as methanol, ethanol, propanol, isopropanol, butanol and its isomers to clear or optically transparent plastic films, sheets, or substrates via flow coating, dip coating, roll coating, spray coating, knife coating, or flooding. Printing processes, dipping, transfer processes and brushing can also be used.

In some embodiments, the clear or optically transparent plastic film, sheet, or substrate can include a thermoplastic polymer, such as ABS, AMMA, ASA, CA, CAB, EP, UF, CF, MF, MPF, PF, PAN, PA, PE, HDPE, LDPE, LLDPE, PC, PET, PMMA, PP, PS, SB, PUR, PVC, RF, SAN, PBT, PPE, POM, PP-EPDM and UP (abbreviations in accordance with DIN 7728 part 1) and mixtures thereof, as well as laminated films constructed from two or more layers of these plastics. In general, films, sheets, or substrates to be used according to the invention may also contain reinforcing fibers or fabrics, provided that these do not impair the desired thermoplastic deformation.

Particularly suitable are thermoplastic polyurethanes, polymethyl methacrylate (PMMA) and modified variants of PMMA, as well as polycarbonate (PC), ASA, PET, PP, PP-EPDM and ABS.

The composition described herein can be coated on one or both sides of the film, sheet, or substrate. In the case of single-sided coating, a thermally deformable adhesive layer may optionally be applied to the reverse of the film, i.e., to the surface on which the coating composition has not been applied. Depending on the method, hot-melt adhesives or radiation-curing adhesives are suitable for this purpose. In addition, a protective film which is likewise thermally deformable may also be applied on to the surface of the adhesive layer. It is further possible to provide the reverse of the film with support materials such as fabrics, but these should be deformable to the desired extent.

Before or after applying the composition, the sheet, film, or substrate may optionally be lacquered or printed with one or more layers. This may take place on the coated or on the uncoated side of the film. The layers may be colored or functional, and applied over the entire surface or only part thereof, e.g., as a printed image. The lacquers used should be thermoplastic so that they do not crack during subsequent deformation. Printing inks as commercially available for so-called "in-mold decoration" processes can be used.

Once the coating composition is applied to the film, sheet, or substrate the solvent can be evaporated and the coating dried. For this purpose, drying can be carried out particularly at elevated temperatures in ovens, e.g., convection ovens, jet dryers, as well as heat radiation (IR, NIR). It is possible and advantageous to combine several of these drying processes. The conditions for drying are advantageously selected such that no unblocking and polymerization (crosslinking) of the isocyanate groups is triggered by the elevated temperature and/or heat radiation, since this can have a negative effect on thermoformation. Furthermore, the maximum temperature reached should usefully be selected to be sufficiently low that the film does not deform in an uncontrolled manner.

The applied coating can be initially cured via actinic radiation, e.g., UV radiation, to form a tack free coating that remains pliable yet resists damage due to handling of the coated article. Curing with actinic radiation is understood to be the free-radical polymerization of ethylenically unsaturated carbon-carbon double bonds of the acrylate and/or methacrylate by means of initiator radicals which are released by irradiating with actinic radiation, e.g., from the photoinitiators described above.

The radiation curing can take place through the impact of high-energy radiation, i.e., UV radiation or daylight, e.g., light at a wavelength of about 200 nm to about 750 nm, or by irradiating with high-energy electrons (electron beam, e.g., of about 90 keV to about 300 keV). Examples of radiation sources for light or UV light are medium- or high-pressure mercury vapor lamps, wherein the mercury vapor may be modified by doping with other elements such as gallium or iron. Lasers, pulsed lamps (known as UV flash lamps), halogen lamps or excimer lamps may also be used. The lamps may be installed in a fixed position so that the coating to be irradiated is moved past the radiation source using a mechanical device, or the lamps may be movable and the coating to be irradiated does not change its position during the curing. The radiation dose generally sufficient for crosslinking with UV curing is in the range of about 80 mJ/cm$^2$ to about 5000 mJ/cm$^2$.

The irradiation may optionally also take place with the exclusion of oxygen, e.g., under an inert gas atmosphere or oxygen-reduced atmosphere. Suitable as inert gases are preferably nitrogen, carbon dioxide, noble gases or combustion gases. Furthermore, the irradiation can take place by covering the coating with media which are transparent to radiation. Examples of these are e.g., polymer films, glass, or liquids.

The actinic radiation cured coating can be deformable and/or flexible and tack-free. In some embodiments, the tack-free, deformable coating has a glass transition temperature (Tg) of about 38° C. to about 115° C., about 60° C. to about 100° C., or about 80° C. to about 100° C. and a tanδ of about 1.7 to about 3.30, 1.8 to about 3.0, or about 1.9 to about 2.6.

Following actinic radiation curing the coated substrate can be dried to remove water absorbed by the coated substrate at temperatures and times sufficient to remove the absorbed water. The coated substrate can then be heated at an elevated temperature effective to unblock the isocyanate groups and thereby start the second cross linking reaction while also heating the article to a temperature that allows successful forming of the article to the desired shape. By way of example, the coated substrate can be exposed to elevated temperatures greater than 115° C. for 5 to 120 minutes to unblock the isocyanate groups and initiate a urethane exothermic condensation reaction, which further crosslinks the coating.

In some embodiments, the coated substrate can exposed to elevated temperatures during thermoforming, vacuum forming, or compression molding the coated substrate into a desired three dimensional shape.

The resulting dual cured coating exhibits good resistances to solvents and staining liquids as found in the household, as well as high hardness, good scratch resistance and good abrasion resistance with high optical transparency. For example, the rigid, abrasion resistant coating can be substantially crack-free and have a total light transmittance of at least about 80%, at least about 81%, at least about 82%, at least about 83%, at least about 84%, at least about 85%, at least about 86%, at least about 87%, at least about 88%, at least about 89%, at least about 90%, or more as measured at a wavelength of 400 to 700 nm in accordance with ASTM D1003, a delta haze in accordance with ASTM D1003 of about 8.0% or less, a yellow index in accordance with ASTM E313 of 3 or less and an adhesion of at least 3B, 4B, or 5B in accordance with ASTMD3359. In some embodiments the dual cured, rigid, abrasion resistant coating has a temperature (Tg) of about 80° C. to about 130° C., about 90° C. to about 125° C., or about 115° C. to about 125° C. and a tanδ of about 0.50 to about 2.50, about 0.7 to about 2.45, or about 1.48 to about 2.45.

In some embodiments, a film, sheet, or substrate coated with the composition can be used for the production of shaped articles, such as for the production of consumer articles including vehicle add-on parts, plastics parts, such as panels for vehicle (interior) construction and/or aircraft (interior) construction, furniture construction, electronic devices, communication devices, housings, and decorative articles.

Other embodiments described herein relate to an article coated with a coating composition described herein that is processed in flat sheet form, film or sheet, using actinic radiation to cure to a tack free and easily handleable state; that is subsequently dried, heated and formed to a 3D geometry using drape or thermoforming techniques.

In some embodiments, the article is formed into a protective visor that has abrasion and chemical resistant properties.

In some embodiments, the article is formed into a windshield for a motorcycle, side by side or ATV that has abrasion and chemical resistant properties.

In some embodiments, the article is formed into a roof or door system that exhibits abrasion and chemical resistant properties.

In some embodiments, the article is formed into a window or multi-layer laminate system for construction or substantially equivalent applications.

In some embodiments, the article is formed using an in mold decoration process to produces lenses, decorative automotive trim or substantially similar item.

In some embodiments, the article is formed into a protective visor or lens faceplate that exhibits abrasion and chemical resistant properties.

Other embodiments described herein relate to a thermoformable coating that can be cast from non-toxic solvents, which are not likely to attack plastic materials used for clear glazing materials and which can be cured to a tack free state using actinic radiation and formed into complex parts.

The following examples are included to demonstrate various aspects of the invention. Those of skill in the art should, in light of the present disclosure, appreciate that many changes can be made in the specific aspects which are disclosed and still obtain a like or similar result without departing from the spirit and scope of the invention.

EXAMPLES

Standard Sheet Drying Procedure

Samples of 0.220″ thickness polycarbonate sheet were placed into a convection oven at 115° C. for 12 hours to lower the moisture content of the sheet such that bubbles will not form in the sheet during forming operations.

Standard Thermo-Forming Procedure:

Samples of 0.220″ thickness polycarbonate sheet, which had already been dried, were placed in a convection oven heated to 175° C. for 20 minutes, or until pliable, then formed around 10-inch diameter mold to evaluate for cracks, delamination or other undesirable optical effects.

Comparative Example 1

25 grams of a commercial UV curable abrasion resistant coating was diluted to 20 wt % solids with 1-methoxy-2-propanol and stirred until a uniform solution resulted. This coating was applied to both sides of a 0.220″ thickness polycarbonate plaque, allowed to flash at 25° C. for 5 minutes, heated at 55° C. for 60 seconds and cured with a 600 Watt per Inch H-type lamp. This coated panel exhibited excellent adhesion (5B ASTM D3359) good scratch and abrasion resistance (2 to 3% delta haze after 100 cycles with CS10F taber abrader wheel per ASTM D1003). This coated plaque was heated at 115° C. for 10 hours to remove moisture from the polycarbonate sheet, then heated to 175° C. for 20 minutes or until the sheet was pliable. This sheet was then dried, formed and evaluated for damage to the coating. There were multiple longitudinal cracks apparent in the coating and the formed part was not judged to be useful for any optical applications.

Comparative Example 2

25 grams of a commercial UV curable abrasion resistant coating, more flexible than in Comparative Example 1, was diluted to 20 wt % solids with 1-methoxy-2-propanol and stirred until a uniform solution resulted. This coating was applied to both sides of a 0.220″ thickness polycarbonate plaque, allowed to flash at 25° C. for 5 minutes, heated at 125° C. for 90 seconds and cured with a 600 Watt per Inch H-type lamp. This coated panel exhibited excellent adhesion (5B ASTM D3359) good scratch and abrasion resistance (6 to 8% delta haze after 100 cycles with CS10F taber abrader wheel per ASTM D1003). This sheet was then dried, formed and evaluated for damage to the coating. There were multiple longitudinal cracks apparent in the coating and the formed part was not judged to be useful for any optical applications.

The coating was applied to both sides of a thin substrate (0.005") using a 16 mayer rod, cured using UV radiation. A sample measuring approximately 13 mm wide, by 30 mm long and 0.15 mm thickness was mounted in a single cantilever attachment for a Hitachi DMA7100 and subjected to a ramp from −85° C. to 150° C. at 10° C./min and subjected to a sinusoidal force at 1 Hz. The measured Tg (peak Tanδ) for the UV cured sample was 105° C. and Tanδ was 1.77. The same sample was subjected to a second cycle to measure the change in thermal properties of the sample. The second Tg (peak tanδ) was 112° C. with a corresponding tanδ of 1.45.

Inventive Example 1

While stirring 24.86 grams of hexafunctional urethane acrylate with pendant hydroxyl groups (hydroxyl equivalent weight 660 grams per mole), 10.07 grams of blocked hexamethylene diisocyanate biuret (isocyanate equivalent weight 410 grams per mole) and 1-methoxy-2-propanol were added, along with 24.80 grams of a urethane diacrylate with pendant hydroxyl groups (hydroxyl equivalent weight ~2100 grams per mole), 5.27 grams of a tetrafunctional polyol derived from caprolactone (hydroxyl equivalent weight 257 grams/mole), 2.50 grams of an amine acrylate synergist, 1.59 grams of a benzophenone derived photoinitiator and 0.12 grams of dibutyl tin dilaurate catalyst. This mixture was diluted to 20 wt % solids with 1-methoxy-2-propanol and stirred until a clear low viscosity solution resulted. A 0.220" thickness polycarbonate plaque was coated and dried at 25° C. for 5 minutes, then placed into an oven at 75° C. for 60 seconds, subjected to actinic radiation (approximately 800 to 1500 mJ/cm2 UVA, 1000 mJ/cm$^2$ UVB and 600 mJ/cm2 UVC) to effect cure. The coated panel was dry and tack free and exhibited moderate abrasion resistance when handled. This part was dried, formed and evaluated for damage to the coating. This coated part showed resistance to scratching with #0000 steel wool, no cracks developed and exhibited 5B adhesion according to ASTM D3359

Inventive Example 2

While stirring 9.48 grams of urethane diacrylate with pendant hydroxyl groups (hydroxyl equivalent weight 2100 grams per mole), 7.76 grams of blocked hexamethylene diisocyanate biuret and 3.64 grams of tetrafunctional polyol were added (hydroxyl equivalent weight 257 grams/mol), photoinitiators and DBTDL were added. This solution was diluted to 20 wt % solids with 1-methoxy-2-propanol, stirred until clear and applied to 0.220" thickness polycarbonate panel and dried for 5 minutes at 25° C. This part was subjected to actinic radiation. Upon evaluation, the coating was very soft and appeared to have no wet film strength, in that mud cracks had developed in the coating during the UV curing process.

Inventive Example 3

While stirring 692.4 grams of a hexafunctional urethane acrylate with pendant hydroxyl groups (hydroxyl equivalent weight 660 gr/mol), 907.2 of a blocked hexamethylene diisocyanate biuret and 405 grams of a caprolactone derived tetrafunctional polyols were added. Once this was thoroughly mixed, 180 grams of photoinitiator were added followed by 10 grams of dibutyl tin dilaurate catalyst. This mixture was stirred until a clear solution resulted then diluted to approximately 20 wt % solids in 1-methoxy-2-propanol and coated onto 0.220" polycarbonate panels. The resulted parts were exposed to actinic radiation to effect cure and allow handling of the parts in a tack free state. These parts where then dried at 115° C. for 12 hours in a recirculation air oven to dry to polycarbonate, then heated to 170° C. for 5 minutes wherein the polycarbonate became flexible and was formed to a 3" plastic core (1.5" radius). The coated part remained clear and exhibited no cracking or loss of adhesion of the coating to the polycarbonate panels.

Inventive Example 4

To a container containing 21.46 grams of a commercially available urethane acrylate oligomer isocyanate functional resin (NCO equivalent weight 344 grams per mol) 5.9652 grams of 3,5 dimethyl pyrazole were added with stirring. The container was heated at 65° C. for 3 hours with the extent of reaction of the isocyanate with the active amine compound monitored by FTIR spectroscopy. Upon disappearance of the isocyanate peak in the IR spectrum, the isocyanate was considered blocked and was used in our tests. This new blocked isocyanate 4.88 grams (equivalent weight 525 grams per mol) was added to 6.64 grams of an hexa-acrylated polyol (equivalent weight 660 grams per mole) and 0.85 grams of a catalyst mixture to allow photo and thermal curing. This mixture was added to 46 grams of methoxy propanol, mixed thoroughly and coated onto a polycarbonate panel, allowed to flash off for 5 minutes at room temperature, heated at 90° C. for 60 seconds and cured with actinic radiation. The part was tack free and clear. This part was then heated at 165° C. for 10 minutes and formed around a 3" plastic mandrel. The part remained clear, had good adhesion and good abrasion resistance without any loss of adhesion or cracking observed in the part. (Example 22 Table 1).

The coating was applied to both sides of a thin substrate (0.005") using a 16 mayer rod, cured using UV radiation. A sample measuring approximately 14 mm wide, by 30 mm long and 0.15 mm thickness was mounted in a single cantilever attachment for a Hitachi DMA7100 and subjected to a ramp from −85° C. to 150° C. at 10° C./min and subjected to a sinusoidal force at 1 Hz. The measured Tg (peak Tanδ) for the UV cured sample was 63.3° C. and Tanδ was 3.30. The same sample was subjected to a second cycle to measure the change in thermal properties of the sample. The second Tg (peak tanδ) was 89.7° C. with a corresponding tanδ of 2.37.

The following Table lists examples of varying formulations of dual curable coating compositions provided on substrates prepared in accordance with the Examples and the properties of the coatings following actinic radiation curing and thermoforming. Notably, experiments 1-6 and 8-14 were performed using variations of the formulation of the coating composition of Inventive Example 1; experiments 7, 15, and 16 were performed using variations of the formulation of the coating composition of Inventive Example 3, and experiments 17-24 were performed using variations of the formulation of the coating composition of Inventive Example 4. Experiment 25 provides the properties of a coating prepared using coating composition of Comparative Example 2. Experiment 26 lists the Light transmission, haze, and yellowness index of an uncoated substrate.

TABLE

| | | | | | |
|---|---|---|---|---|---|
| | | | Dual Cure formable coating experiments | | |
| Experiment # | Blocked isocyanate (NCO eq wt) | 4x polyol (257 OH eq wt) | HFUA polyol (660 gr OH eq wt) | DFUA polyol (2100 gr OH eq wt) | Results after forming |
| 1 | 15 grams | 2.2 | 2.87 | 43.56 | Forming excellent, clear haze free, 5B, soft |
| 2 | 15 grams | 1.77 | 2.27 | 34.40 | |
| 3 | 15 grams | 4.47 | 2.87 | 26.14 | |
| 4 | 15 grams | 3.39 | 2.18 | 19.83 | Excellent forming good abrasion resistance clear haze free Adhesion 5B |
| 5 | 15 grams | 2.23 | 11.48 | 17.43 | |
| 6 | 15 grams | 1.70 | 8.75 | 13.27 | |
| 7 | 15 grams | 6.70 | 11.48 | 0.00 | Excellent forming good abrasion resistance (15) clear haze free Adhesion 5B UV Tg = 39.6 C. tanδ = 2.26 Heat Tg = 111 C. tanδ = 0.88 |
| 8 | 15 grams | 5.10 | 8.71 | 4.42 | |
| 9 | 15 grams | 2.24 | 2.87 | 43.56 | |
| 10 | 15 grams | 1.70 | 2.17 | 33.05 | |
| 11 | 15 grams | 6.70 | 2.87 | 8.78 | Developed mud cracks during drying, soft, clear haze free 5B |
| 12 | 15 grams | 5.10 | 2.18 | 6.61 | |
| 13 | 15 grams | 2.23 | 11.48 | 17.48 | No cracks, clear haze free, 5B |
| 14 | 15 grams | 1.70 | 8.71 | 13.20 | |
| 15 | 15 grams | 6.70 | 11.48 | 0.00 | Excellent forming good abrasion resistance adhesion 5B |
| 16 | 15 grams | 5.10 | 8.71 | 0.00 | |

| Sample ID | Blocked isocyanate | NCO/OH ratio | HFUA polyol (660 gr OH eq wt) | Acrylate/ NCO ratio (FTIR) | |
|---|---|---|---|---|---|
| 17 | 28.54 (410 eq wt) | 1.70 | 11.45 PLUS 9.49 (hydroxyl diacrylate) | 2.17 | UV Tg = 78.2 C., tanδ = 2.06 Heat Tg = 128.6 C. tanδ = 0.56 Mild cracks during heating |
| 18 | 7.16 gr (eq wt = 655) polyurethane acrylate with NCO groups | 0.90 | 7.02 | 2.40 | UV Tg = 99.1 C. tanδ = 2.11 Heat Tg = 123 C. tanδ = 1.48 Good forming. Very abrasion resistant(4) Adhesion 0B, Light transmission 88.5% Haze 0.38 Yellowness Index 1.3 |
| 19 | 5.50 gr (eq wt = 845) Polyurethane acrylate with NCO groups | 0.94 | 4.11 | 2.75 | UV Tg = 98.8 C. tanδ = 1.72 Heat Tg = 123 C. tanδ = 0.70 Excellent forming (0.75" radius) Very abrasion resistant (2) Adhesion 5B Light transmission 88.8% Haze 0.36 Yellowness Index 1.5 |
| 20 | 5.41 gr (eq wt = 603) Polyurethane acrylate with NCO groups | 0.99 | 5.14 | 1.10 | UV Tg = 65.4 tanδ = 2.31 Heat Tg = 83.1 C. tanδ = 0.99 Good forming. Poor abrasion (100+) Adhesion 5B Light transmission 87.8% Haze 0.4 Yellowness Index 2.4 |
| 21 | 5.95 gr(eq wt = 433) Polyurethane acrylate with NCO groups | 0.97 | 9.25 | 1 | UV Tg = 115 C. Tanδ = 2.50 Heat Tg = 120.3 tanδ = 2.13 Good forming. Very abrasion resistant(8) Adhesion 3B Light transmission 87.3% Haze 0.33 Yellowness Index 1.4 |
| 22 | 4.88 gr (eq wt = 344) Polyurethane acrylate with NCO groups | 0.92 | 6.64 | 0.85 | UV Tg = 63.3 tanδ = 3.30 Heat Tg = 89.7 tanδ = 2.37 Good forming. Moderate abrasion resistance (50) Adhesion 5B Light |

TABLE-continued

| | | | | Dual Cure formable coating experiments |
|---|---|---|---|---|
| | | | | transmission 86.6% Haze 0.48 Yellowness Index 1.3 |
| 23 | 6.03 gr (eq wt = 584) Polyurethane acrylate with NCO groups | 1.00 | 5.84 | 1 | UV = 85.5 C. tanδ = 3.02 Heat Tg 103.3 tanδ = 2.45 |
| 24 | 5.37 gr (eq wt = 540) Polyurethane acrylate with NCO groups | 0.95 | 5.90 | 1.15 | UV = 91.6 C. tanδ = 1.95 Heat Tg = 120° C. tanδ = 0.84 Good forming. Moderate abrasion resistance (60) Adhesion 5B Light transmission 86.4% Haze 0.4 Yellowness Index 1.3 |
| 25 | Acrylate UV cure control | | | | UV = 105 C. tanδ = 1.77 Heat 112 C. tanδ = 1.45 Cracks during forming Good abrasion resistance (12) Adhesion 5B Light transmission 87.4% Haze 0.28 Yellowness Index - 0.5 |
| 26 | Uncoated Substrate | | | | Light transmission 87.6% Haze 0.28 Yellowness Index 0.3 | a) Photoinitiators at 5.5% acrylate amine synergist and 3.5% benzophenone derivative
b) DBTDL added 0.50% active for formulation
c) UV cure conditions:
a. UVA 1582 mW/cm$^2$, 1100 mJ/cm$^2$
b. UVB 1647 mW/cm$^2$, 1150 mJ/cm$^2$
c. UVC 630 mW/cm$^2$, 436 mJ/cm$^2$
d. UVV 2030 mW/cm$^2$, 1427 mJ/cm$^2$
d) Drying: 115° C. for 15 hours
e) Forming: 175° C. for 20 minutes or until pliable, formed around 10" or smaller mandrel
f) Abrasion resistance: 500 gram load, 50 cycles at 60 cycles/min #0000 steel wool 10 mm diameter pad. Count scratches at 40x magnification under polarized light microscope. Report number of scratches. Higher number is worse.
g) Adhesion ASTM D3359
h) Light transmission, Haze, Yellowness Index ASTM D1003

From the above description of the invention, those skilled in the art will perceive improvements, changes and modifications. Such improvements, changes and modifications within the skill of the art are intended to be covered by the appended claims. All references, publications, and patents cited in the present application are herein incorporated by reference in their entirety.

What is claimed:

1. A dual-curable, coating composition that is castable from an alcohol solvent, the coating composition comprising:
   a blocked polyisocyanate having a blocking group selected from the group consisting of diethyl malonate, 3,5 dimethyl pyrazole, methyl ethyl ketoxime, and caprolactam,
   a polyol with a hydroxy functionality greater than 2,
   a monomeric or oligomeric reactant having both ethylenically unsaturated acrylate and/or methacrylate functionality and pendant and/or terminal isocyanate reactive groups, and
   a photoinitiator;
   wherein the composition undergoes an initial curing reaction via the photoinitiator and actinic radiation, causing the ethylenically unsaturated acrylate and/or methacrylate functionality of the monomeric or oligomeric reactant to undergo free-radical polymerization, resulting in is a tack-free, deformable coating; and
   wherein the composition undergoes a secondary curing reaction by heating the tack-free deformable coating at an elevated temperature, causing the blocked polyisocyanate to unblock and initiate a urethane exothermic reaction with the polyol and the pendant and/or terminal isocyanate reactive groups of the polymerized monomeric or oligomeric reactant, resulting in a rigid coating having high hardness, good scratch resistance and good abrasion resistance with high optical transparency.

2. The composition of claim 1, wherein the tack-free, deformable coating has a glass transition temperature (Tg) of about 38° C. to about 115° C. and a tanδ of about 1.7 to about 3.30, and the rigid, coating has a Tg of about 80° C. to about 130° C. and a tanδ of about 0.50 to about 2.50.

3. The composition of claim 1, further comprising at least one of a polyurethane catalyst, an alcohol solvent, a UV light inhibitor, a hindered amine light stabilizer, a flow control agent, an amine synergist, or inorganic oxide particles.

4. The composition of claim 1, further comprising an alcohol solvent, wherein the alcohol solvent is not reactive with a substrate.

5. The composition of claim 1, wherein the monomeric or oligomeric reactant has a hydroxy functionality greater than 2.

6. The composition of claim 1, wherein the composition is applied to a thermoformable substrate, wherein the initial curing reaction occurs on the thermoformable substrate prior to thermoforming, and the secondary curing reaction occurs on the thermoformable substrate during thermoforming.

7. The composition of claim 1, wherein the blocked polyisocyanate comprises at least one of a blocked hexamethylene diisocyanate, blocked hexamethylene diisocyanate biuret, blocked hexamethylene diisocyanate trimer, blocked isophorone diisocyanate, or a blocked isocyanate functional urethane acrylate resin.

8. The composition of claim 7, wherein the blocked polyisocyanate is blocked with 3,5 dimethyl pyrazole.

9. The composition of claim 1, wherein the polyol has a hydroxyl equivalent weight of about 200 to about 6000 grams/mole.

10. The composition of claim 9, wherein the polyol is derived from at least one of pentaerythritol, glycerol, or caprolactone.

11. The composition of claim 1, wherein the pendant and/or terminal isocyanate reactive groups of the monomeric or oligomeric reactant comprise hydroxyl groups.

12. The composition of claim 11, wherein the monomeric or oligomeric reactant has a hydroxyl equivalent weight of about 200 to about 6000 grams/mole and an acrylate and/or methacrylate functionality of about 2 to about 8.

13. The composition of claim 1, wherein the rigid coating is substantially crack-free and has a total light transmittance of at least about 86% as measured at a wavelength of 400 to 700 nm in accordance with ASTM D1003, a delta haze in accordance with ASTM D1003 of about 8.0% or less, a yellow index in accordance with ASTM E313 of 3 or less, and an adhesion of 3B or greater in accordance with ASTMD3359.

14. The composition of claim 1, wherein the monomeric or oligomeric reactant is a urethane monomer or oligomer having both ethylenically unsaturated acrylate and/or methacrylate functionality and pendant and/or terminal isocyanate reactive groups.

15. A coated substrate comprising a substrate coated with the dual-curable, coating composition of claim 1.

16. The coated substrate of claim 15, wherein the tack-free, deformable coating has a glass transition temperature (Tg) of about 38° C. to about 115° C. and a tanδ of about 1.7 to about 3.30, and the rigid coating has a Tg of about 80° C. to about 130° C. and a tanδ of about 0.50 to about 2.50.

17. The coated substrate of claim 15, wherein the blocking group of the blocked polyisocyanate forms a UV stabilizer that is latent when the polyisocyanate is blocked, and is effective in absorbing damaging UV radiation when the polyisocyanate is unblocked, thereby protecting the substrate from UV radiation.

18. The coated substrate of claim 15, wherein the substrate is a thermoformable substrate, the initial curing reaction occurs on the thermoformable substrate prior to thermoforming, and the secondary curing reaction occurs on the thermoformable substate during thermoform; wherein the rigid coating is substantially crack-free and has a total light transmittance of at least about 86% as measured at a wavelength of 400 to 700 nm in accordance with ASTM D1003, a delta haze in accordance with ASTM D1003 of about 8.0% or less, a yellow index in accordance with ASTM E313 of 3 or less, and an adhesion of 3B or greater in accordance with ASTMD3359.

19. The coated substrate of claim 15, wherein the substrate is formed from an optically transparent polymer.

20. The coated substrate of claim 19, wherein the optically transparent polymer comprises at least one of polymethyl methacrylate, polycarbonate, or PET.

21. The coated substrate of claim 15, wherein the monomeric or oligomeric reactant is a urethane monomer or oligomer having both ethylenically unsaturated acrylate and/or methacrylate functionality and pendant and/or terminal isocyanate reactive groups.

22. An article comprising the coated substrate of claim 15, wherein the article is a protective visor, a windshield for a motor vehicle, a lens, a decorative automotive trim, window, roof, door system, or molding.

* * * * *